US007146423B2

(12) United States Patent
Chin et al.

(10) Patent No.: US 7,146,423 B2
(45) Date of Patent: Dec. 5, 2006

(54) METHOD FOR INTEGRATING MULTIPLE WEB SERVERS BASED ON INDIVIDUAL CLIENT AUTHORIZATION

(75) Inventors: Hung-Liang Chin, Taipei (TW); Yi-Ming Liao, Taipei (TW); Ming-Hsiao Hsieh, Taipei (TW); Po-Wen Lu, Taipei (TW); Mhing-Fen Lee, Taipei (TW)

(73) Assignee: Inventec Corporation (TW)

( * ) Notice: Subject to any disclaimer, the term of this patent is extended or adjusted under 35 U.S.C. 154(b) by 779 days.

(21) Appl. No.: 10/023,877

(22) Filed: Dec. 21, 2001

(65) Prior Publication Data

US 2003/0120738 A1    Jun. 26, 2003

(51) Int. Cl.
*G06F 15/16* (2006.01)
*G06F 17/30* (2006.01)

(52) U.S. Cl. .............................. 709/229; 707/9; 726/4

(58) Field of Classification Search ................ 709/225, 709/229; 705/54; 707/2, 9, 102; 713/201; 726/2, 4, 16
See application file for complete search history.

(56) References Cited

U.S. PATENT DOCUMENTS

| | | | | |
|---|---|---|---|---|
| 6,178,510 B1* | 1/2001 | O'Connor et al. | ........... | 713/201 |
| 6,182,142 B1* | 1/2001 | Win et al. | .................... | 709/229 |
| 6,233,565 B1* | 5/2001 | Lewis et al. | ................... | 705/35 |
| 6,408,282 B1* | 6/2002 | Buist | ........................ | 705/36 R |
| 6,453,353 B1* | 9/2002 | Win et al. | .................... | 709/229 |
| 6,490,624 B1* | 12/2002 | Sampson et al. | ........... | 709/227 |
| 6,529,952 B1* | 3/2003 | Blumenau | .................... | 709/223 |
| 6,574,656 B1* | 6/2003 | Nagaoka et al. | ............ | 709/201 |
| 6,578,029 B1* | 6/2003 | Gershfield et al. | ............. | 707/2 |
| 6,601,233 B1* | 7/2003 | Underwood | ................. | 717/102 |
| 6,609,154 B1* | 8/2003 | Fuh et al. | .................... | 709/225 |
| 6,633,872 B1* | 10/2003 | Ambrosini et al. | ............ | 707/9 |
| 6,704,787 B1* | 3/2004 | Umbreit | ..................... | 709/229 |
| 6,714,930 B1* | 3/2004 | Garrison et al. | ............... | 707/9 |
| 6,728,766 B1* | 4/2004 | Cox et al. | .................... | 709/220 |
| 6,728,884 B1* | 4/2004 | Lim | .......................... | 713/201 |
| 6,732,179 B1* | 5/2004 | Brown et al. | ................ | 709/229 |
| 6,748,592 B1* | 6/2004 | Porter | ....................... | 718/100 |
| 6,754,681 B1* | 6/2004 | Brodersen et al. | .......... | 707/202 |
| 6,772,167 B1* | 8/2004 | Snavely et al. | ............. | 707/102 |
| 6,785,729 B1* | 8/2004 | Overby et al. | .............. | 709/229 |
| 6,807,542 B1* | 10/2004 | Bantz et al. | ................... | 707/9 |
| 6,857,053 B1* | 2/2005 | Bolik et al. | .................. | 711/162 |
| 6,952,781 B1* | 10/2005 | Chang et al. | ................... | 726/4 |
| 7,072,940 B1* | 7/2006 | Day et al. | .................... | 709/204 |
| 2001/0047306 A1* | 11/2001 | Garretson | ..................... | 705/26 |
| 2002/0165724 A1* | 11/2002 | Blankesteijn | .................. | 705/1 |

\* cited by examiner

*Primary Examiner*—Andrew Caldwell
*Assistant Examiner*—Stephan Willett
(74) *Attorney, Agent, or Firm*—Bacon & Thomas PLLC

(57) ABSTRACT

A method for integrating multiple web servers based on individual client authorization consists of setting up a client, a master web server, and at least one slave web server through a network such that after the said master web server receives commands inputted by the said client, an authentication routine relative to the said client is executed based on the said commands to determine the individual authorization level of the said client and web pages are collected from the said master server and slave web that the client is permitted to browse based on the said individual authorization level and, furthermore, web pages are respectively displayed via a specific screen model on the computer system of the said client.

4 Claims, 4 Drawing Sheets

|     | Identification Card Number | User Name | Verification Number |
| --- | --- | --- | --- |
| 110 | IEC871172 | Chiu Hung-liang | PONY |
|     | ⋮ | ⋮ | ⋮ |
|     | ⋮ | ⋮ | ⋮ |
|     | ⋮ | ⋮ | ⋮ |
|     | ⋮ | ⋮ | ⋮ |
|     | ⋮ | ⋮ | ⋮ |

100 — table; 112 Identification Card Number; 114 User Name; 116 Verification Number

FIG. 1

|     | Identification Card Number | User Name | Group Name |
| --- | --- | --- | --- |
| 210 | IEC871172 | Chiu Hung-liang | DBADMIN |
|     | ⋮ | ⋮ | ⋮ |
|     | ⋮ | ⋮ | ⋮ |
|     | ⋮ | ⋮ | ⋮ |
|     | ⋮ | ⋮ | ⋮ |
|     | ⋮ | ⋮ | ⋮ |

200 — table; 212 Identification Card Number; 214 User Name; 216 Group Name

FIG. 2

| Group Name | Individual Authorization Name | User Name |
|---|---|---|
| DBADMIN | MT-OSFMATERIAL | Chiu Hung-liang |
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |

FIG. 3

| Individual Authorization Name | Web Page Name | Connection Site |
|---|---|---|
| MT-OSFMATERIAL | Inventory Management | ⋮ |
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |

FIG. 4

METHOD FOR INTEGRATING MULTIPLE WEB SERVERS BASED ON INDIVIDUAL CLIENT AUTHORIZATION

BACKGROUND OF THE INVENTION

1) Field of the Invention

The invention herein relates to network access management, specifically a method for integrating multiple web servers based on individual client authorization.

2) Description of the Prior Art

Due to innovations in the network technology and significant reduction in network hardware and software set up costs in recent years, many companies have lowered the related expenses to unprecedented levels. Business networks have been established between internal company departments and related corporate groups or their upstream and downstream manufacturers and, furthermore, the utilized database systems collect and arrange information through the networks for statistical and analytical purposes such that the latest data is available at all times. This is especially true of multinational companies in the process of integrating product design, development, manufacturing, and marketing to meet the varying requirement of markets in different regions, thereby enabling the faster design and output of products for those markets as well as more rapid worldwide marketing. In addition to the extensive use of regional network systems and the continuous enhancing of internal company department data communications efficiency, Internet utilization has increased between related on-line corporate groups as well as upstream and downstream manufacturers to rapidly and, furthermore, accurately obtain market information that enables them to precisely understand market demand and thereby swiftly achieve comprehensive product distribution, a considerable decrease warehousing costs, and lower data forwarding times. As such, companies are not only capable of manufacturing products that meet consumer requirements and, furthermore, are competitively priced, but also have the capacity to source the latest data at an accelerated rate.

The network systems presently set up in various corporate groups are generally comprised of a web server and a plurality of clients, with the said server having an immense database system. The said database system consist of a quantity of databases utilized for the storage of various normal business operation records and the said records are categorized by subject under a range of different fields. For example, the product order database of a manufacturer typically includes order numbers, type, component names, unit price, and other fields, the said fields constituting internal database records. The said plurality of clients are respectively linked to the said server and, furthermore, respectively utilize a database program user interface screen that enables access to the database system of the said server through the said clients and the inputting of data into the database records or searching for data stored in the said database records.

In such network systems, the said web server executes an authentication routine based on commands inputted by the clients and then grants a said client a certain user authorization level according to the post-authentication results, enabling the said client to browse, edit, and save web pages in the said server that are permitted by the said authorization level; when the said client thereafter wants to browse web pages in another web server, the said client must exit the accessed said web server and log onto another web server, which involves repeating the said authentication procedure before access is granted to browse, edit, and save web pages in the said other web server. Client users conducting searches of various internal company department, related corporate groups, and upstream/downstream manufacturer web pages in web servers must repeat the authentication routine at each said web server, which results in numerous user inconveniences and difficulties.

In view of the authentication routine required of users at conventional clients when access is desired to web pages in conventional network system web servers and the repetition of the authentication routine to log onto each said web server as well as the resulting user inconveniences and difficulties, the inventor of the invention herein conducted long-term research and testing to improve the conventional shortcomings which culminated in the successful development and design of the method for integrating multiple web servers based on individual client authorization of the invention herein.

SUMMARY OF THE INVENTION

An objective of the invention herein is to provide a method for integrating multiple web servers based on individual client authorization, wherein the said method consists of setting up a client, a master web server, and at least one slave web server through a network such that after the said master web server receives commands inputted by the said client, an authentication routine relative to the said client is executed based on the said commands to determine the individual authorization level of the said client and web pages are collected from the said master server and slave web that the client is permitted to browse based on the said individual authorization level and, furthermore, web pages are respectively displayed via a specific screen model on the computer system of the said client.

Another objective of the invention herein is to provide a method for integrating multiple web servers based on individual client authorization, wherein during searches, it is only necessary to directly select from the said specific screen model at the client end to access the corresponding web server and display the relevant web pages, thereby effectively enabling the user to search for various web pages in the said master web servers without the repeating authentication routine to log onto each said web server and thus avoiding the resulting inconveniences and difficulties.

BRIEF DESCRIPTION OF THE DRAWINGS

FIG. 1 is the identification comparison table of the invention herein.

FIG. 2 is the group comparison table of the invention herein.

FIG. 3 is the group authorization comparison table of the invention herein.

FIG. 4 is the individual authorization comparison table of the invention herein.

DETAILED DESCRIPTION OF THE INVENTION

In the method for integrating multiple web servers based on individual client authorization of the invention herein, the said method consists of setting up a master web server of a manufacturer, at least one slave web server, and at least one client through a network; the said slave web server belongs to a cooperating company (such as a product buyer or a components supplier, etc.) that supports the said manufacturer and, furthermore, goods transaction information derived from financial management, production management, and materials management data (such as orders, price quotes, and components inventory, etc.) are automatically updated between the said master web server and the said slave web server through the network, the internal departments of the said client, the said manufacturer, and the said cooperating company logging onto the network with various computer systems; since the automatic updating of data is widely utilized on networks and is not central to the patent application of the invention herein, it shall not be further elaborated.

When any client logs onto the said master web server, the said master web server executes an authentication routine relative to the said client based on commands inputted by the said client, determines the individual authorization level possessed by the said client utilizing the post-authentication results, and collects and compiles web pages from the said master web server and the said slave server that the client is permitted to browse; the said web page is of a specific screen model that is displayed on the computer system of the said client.

When the user wants to conduct a search through the web pages of the said web servers, it is only necessary to directly select from the said specific screen model at the client end to access the corresponding web server and display the relevant web pages, the said web pages containing information relating to the goods transactions derived from the financial management, production management, and materials management data of the manufacturer and the said cooperating company; since data between the said master web server and the said slave web server is automatically updated through the network, clients can browse the latest data at any time to circumvent data forwarding errors and, furthermore, it is not necessary to execute repeated operations on the said master web server and the said slave web server.

Figure 6:
FIG. 6 is the specific screen model of the invention herein.

In the invention herein, referring to FIG. 6, the file management of the said specific model is the same as that of the Microsoft Windows operating system, wherein the respective name of each web page is displayed and the names of the said web pages contain the web page connection sites; as such, after a web page name is selected, the computer system of the client enters the corresponding said connection site of the web page based on the said connection site. Since the specific screen model displayed on the computer system of the client was completed with web page editing software currently available on the market that has long been widely utilized on existent network systems and, furthermore, is not central to the patent application of the invention herein, it shall not be further elaborated.

In the preferred embodiment of the invention herein, the commands inputted by the client includes an identification number and a verification number; the said master web server has a authorization database and when the said master web server reads a said identification number and a said verification number, it searches for an individual authorization level in the said authorization database that matches the said identification number and verification number and then collects web pages in the said master web server and slave web server the client is permitted to browse based on the said individual authorization level.

The said authorization database is comprised of an identification comparison table 100 (as shown in FIG. 1), a group comparison table 200 (as shown in FIG. 2), a group authorization comparison table 300 (as shown in FIG. 3), and an individual authorization comparison table 400 (as shown in FIG. 4), wherein the said identification comparison table 100 has a plurality of entries (or rows) 110 each having an identification number 112 as well as a verification number 116 and user name 114 that is associated with said identification number, the said group comparison table 200 has a plurality of entries (or rows) 210 each having an identification number 212 as well as a group name 216 and user name 214 that are associated with said identification number, the said group authorization comparison table 300 has a plurality of entries (or rows) 310 each having a group name 312 as well as an individual authorization name 314 and a user name 316 that are associated with said group name, and said individual authorization comparison table 400 has a plurality of entries (rows) 410 each having an individual authorization name 412, as well as a web page name 414 and web page name connection site 416 that are associated with said individual authorization name.

Figure 5:
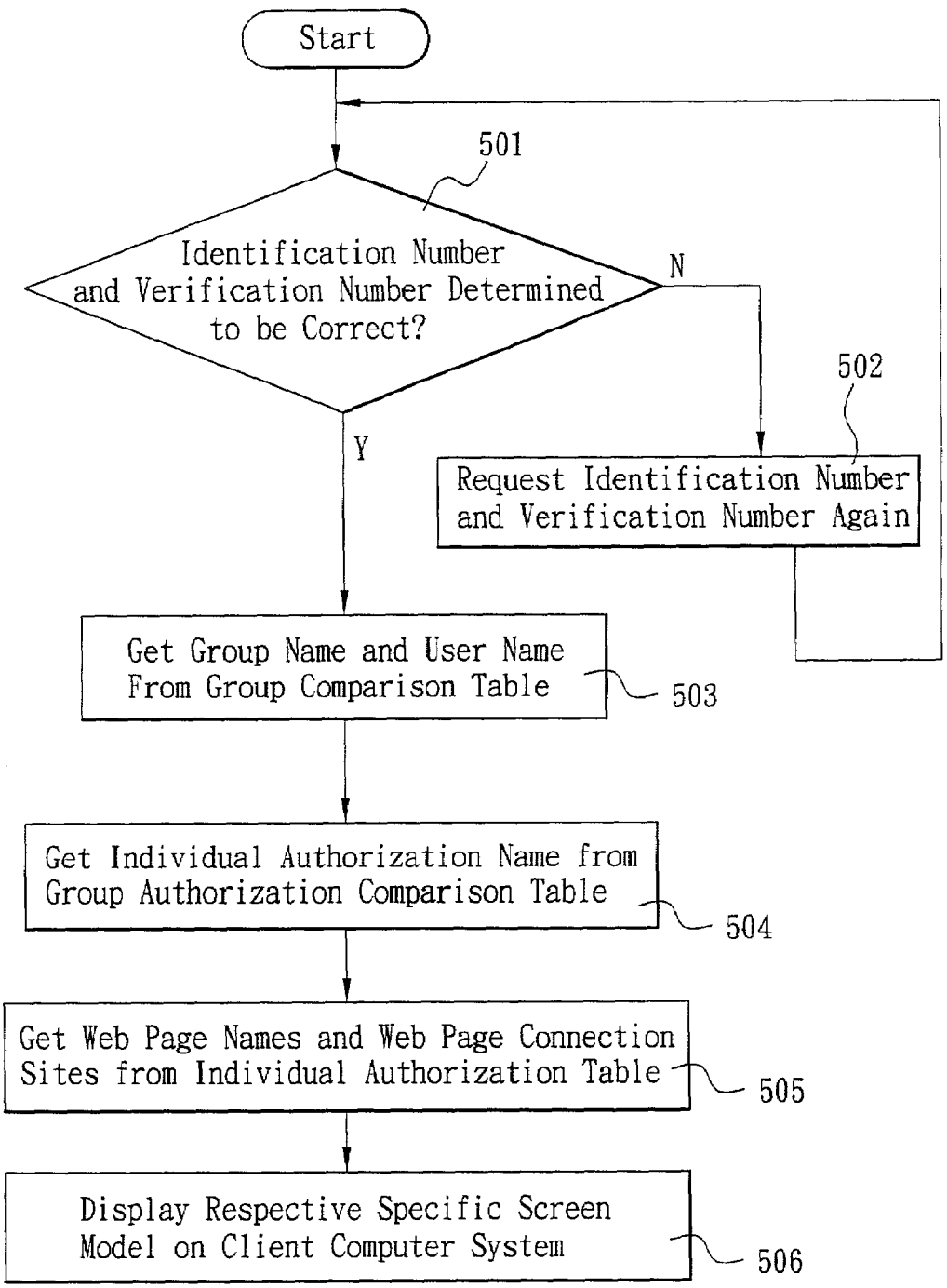
FIG. 5 is a flow chart of the master web server routine based on the identification code and recognition code inputted by the client.

Based on the identification number and verification number inputted by the client, the said master web server sequentially executes the steps below, referring to FIG. 5:

At step 501, the said identification number and verification number are first checked against the said identification comparison table to determine if they are correct; if the result is affirmative, step 503 is executed; and if the result is negative, step 502 is executed.

At step 502, the computer system of the client is requested to once again output an identification number and a verification number.

At step 503, based on the said identification number in the said group comparison table, the same identification number is searched for that matches the said identification number and is utilized to obtain the identification number under the group names and user names.

At step 504, based on the group names and the user names found after the search, the said group names are searched for in the said group authorization comparison table, with the user names that conform to the same group names and user names utilized to obtain the individual authorization name under the said group names and user names.

In step 505, utilizing the said individual authorization name, the same individual authorization name that matches the said individual authorization name is searched for in the said individual authorization comparison table, and then access to the commensurate web page names and web page connection sites is granted according to the matching said individual authorization name.

In step 506, the said web page names and web page connection sites are respectively displayed on the specific screen model on the computer system of the client.

While the invention has been described by means of specific embodiments, numerous modifications and variations could be made thereto by those skilled in the art without departing from the scope and spirit of the invention set forth in the claims.

What is claimed is:

1. A method for integrating multiple web servers based on individual client authorization, the said method comprises setting up a master web server of a manufacturer, at least one slave web server, and at least one client through a network, the master web server having an authorization data base; the said slave web server belongs to a cooperating company that supports the said manufacturer and, furthermore, goods transaction information derived from financial management, production management, and materials management data are automatically updated between the said master web server and the said slave web server through the network, the said client refers to a plurality of computer systems of various departments of the said manufacturer and the said cooperating company which can log onto the network; wherein the said master web server sequentially executes the steps below:

while any client logs onto the said master web server, executing an authentication routine relative to the said client based on commands inputted by the said client, the commands including an identification number and a verification number, and utilizing post-authentication results to determine the individual authorization level possessed by the said client;

when the said master web server reads a said identification number and a said verification number, the said master web server searching for an individual authorization level in the said authorization database that matches the said identification number and verification number and then collecting web pages from the said master web server and slave web server the client is permitted to browse and edit based on the said individual authorization level, then displaying the name of each of said web pages according to a specific screen model on the computer system of the said client, in which the said web pages contain information relating to the goods transactions derived from the financial management, production management, and materials management data of the manufacturer and the said cooperating company;

wherein the computer system of the client can directly access the corresponding web server and display the relevant web pages by reference to the names displayed according to the said specific screen model, without further authentication;

wherein the said authorization database is comprised of;

an identification comparison table; said identification comparison table being configured to store a plurality of entries each having an identification number and a verification number and user name associated with said identification number:

a group comparison table; said group comparison table being configured to store a plurality of entries each having an identification number and a group name and user name associated with said identification number;

a group authorization comparison table; said group authorization comparison table being configured to store a plurality of entries each having a group name and an individual authorization name and user name associated with said group name; and an individual authorization comparison table; said individual authorization comparison table being configured to store a plurality of entries each having an individual authorization name and a web page name and web page name connection site associated with said individual authorization name.

2. The method of claim 1, wherein based on the identification number and verification number inputted by the client, the said master web server further executes the steps below:

based on the said identification number in the said group comparison table, searching for the same identification number that matches the said identification number and obtaining the identification number under the group names and user names;

based on the group names and the user names found after the search, searching the said group names and the said user names that conform to the same group names and user names in the said group authorization comparison table, and obtaining the individual authorization name under the said group names and user names;

utilizing the said individual authorization name to search the same individual authorization name that matches the said individual authorization name in the said individual authorization comparison table, and accessing the commensurate web page names and web page connection sites granted according to the said matching individual authorization name;

finally, displaying the said web page names and web page connection sites respectively on the specific screen model on the computer system of the client.

3. The method of claim 2, wherein the said master web server further executes the steps of while determining that the said identification number and verification number are incorrect, requesting the computer system of the client to once again output an identification number and a verification number.

4. The method of claim 1, wherein the said specific screen model comprises graphic display of respective web page data and the data displayed indicates the matching web page names of the web pages, with the said displayed data containing the web page connection sites; as such, after a web page name is selected, the computer system of the client enters the corresponding said connection site of the web page based on the said connection site.

* * * * *